(12) United States Patent
Adams et al.

(10) Patent No.: US 8,307,317 B2
(45) Date of Patent: *Nov. 6, 2012

(54) STATISTICAL ON-CHIP VARIATION TIMING ANALYSIS

(75) Inventors: Amzie Adams, Raleigh, NC (US); Alessandra Nardi, Hayward, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/195,582

(22) Filed: Aug. 1, 2011

(65) Prior Publication Data

US 2011/0289465 A1 Nov. 24, 2011

Related U.S. Application Data

(63) Continuation of application No. 12/135,031, filed on Jun. 6, 2008, now Pat. No. 7,992,114.

(51) Int. Cl.
*G06F 17/50* (2006.01)
(52) U.S. Cl. ...................................... 716/113
(58) Field of Classification Search .................. 716/100, 716/113
See application file for complete search history.

(56) References Cited

U.S. PATENT DOCUMENTS

| | | | |
|---|---|---|---|
| 5,383,167 A | 1/1995 | Weil | |
| 7,458,049 B1 | 11/2008 | Tuncer | |
| 7,474,999 B2 * | 1/2009 | Scheffer | 703/14 |
| 7,487,475 B1 | 2/2009 | Kriplani | |
| 7,802,215 B2 * | 9/2010 | Reddy et al. | 716/113 |
| 7,992,114 B1 * | 8/2011 | Adams et al. | 716/110 |
| 8,037,430 B2 * | 10/2011 | Papanikolaou et al. | 716/56 |
| 2002/0038092 A1 | 3/2002 | Stanaland | |
| 2004/0122642 A1 * | 6/2004 | Scheffer | 703/14 |
| 2005/0246117 A1 * | 11/2005 | Hathaway et al. | 702/69 |
| 2005/0251771 A1 * | 11/2005 | Robles | 716/5 |
| 2006/0059446 A1 | 3/2006 | Chen | |
| 2006/0090150 A1 | 4/2006 | Kucukcakar | |
| 2006/0107244 A1 * | 5/2006 | Yonezawa | 716/4 |
| 2007/0156367 A1 * | 7/2007 | Kucukcakar et al. | 702/123 |
| 2007/0174797 A1 * | 7/2007 | Luo et al. | 716/4 |
| 2007/0283305 A1 * | 12/2007 | Reddy et al. | 716/6 |
| 2008/0005707 A1 * | 1/2008 | Papanikolaou et al. | 716/4 |
| 2008/0005907 A1 * | 1/2008 | Scheffer | 30/94 |
| 2008/0010558 A1 | 1/2008 | Ikeda | |
| 2008/0133202 A1 * | 6/2008 | Tseng et al. | 703/14 |
| 2008/0222586 A1 | 9/2008 | Homma | |
| 2008/0270962 A1 | 10/2008 | Chadwick | |

(Continued)

OTHER PUBLICATIONS

Chang, Keh-Jeng "Accurate on-chip variation modeling to achieve design for manufacturability", From Proceedings of the 4th IEEE International Workshop on System-on-Chip for Real-Time Applications, Jul. 2004, pp. 219-222.

(Continued)

*Primary Examiner* — Suchin Parihar
(74) *Attorney, Agent, or Firm* — Adams Intellex, PLC

(57) ABSTRACT

A statistical on-chip variation approach to timing analysis permits the automated or semi-automated selection of design-specific margins without requiring complex statistical libraries. By separately addressing the impact of random and systematic variations on timing, a design-specific margin can be obtained and used in downstream OCV analysis. In addition, where statistical libraries are available for some portions of a design, these can be incrementally included in the timing analysis to obtain more accurate results.

34 Claims, 9 Drawing Sheets

U.S. PATENT DOCUMENTS

| | | | |
|---|---|---|---|
| 2009/0228250 A1* | 9/2009 | Phillips | 703/2 |
| 2010/0287517 A1* | 11/2010 | Buss et al. | 716/6 |
| 2011/0087478 A1* | 4/2011 | Tseng et al. | 703/14 |
| 2011/0106497 A1* | 5/2011 | Visweswariah et al. | 702/182 |

OTHER PUBLICATIONS

Devgan, Anirudh et al., "Block-based static timing analysis with uncertainty", From the conference ICCAD '03 in San Jose, CA (Nov. '03), Nov. 13, 2003, pp. 607-614.

Tseng, Ken et al., "Cell model creation for statistical timing analysis", Available online http://www.eetimes.conn/ showArticle.jhtml?articleID=190 100003, (07103106),1-5.

Hong, Jerry et al., "An LLC-OCV Methodology for Statistic Timing Analysis", From IEEE 2007, (Apr. 27, 2007),1-4.

Nardi, A et al., "Use of Statistical Timing Analysis on Real Designs", From Design, Automation & Test in Europe Conference & Exhibition, 2007, (Apr. 20, 2007),1-6.

Mutlu, Athan et aL., "An Exploratory Study on Statistical Timing Analysis and Parametric Yield Optimization", From ISQED '07. 8th International Symposium on, Date: Mar. 26-28, 2007, (Mar. 28, 2007),677-684.

* cited by examiner

STATISTICAL ON-CHIP VARIATION TIMING ANALYSIS

RELATED APPLICATIONS

This application is a continuation of U.S. patent application "Timing Analysis Using Statistical On-Chip Variation" Ser. No. 12/135,031, filed Jun. 6, 2008 which is hereby incorporated by reference in its entirety.

BACKGROUND

1. Field of the Invention

This application relates to electronic design automation, and more particularly to on-chip variation using statistical timing analysis.

2. Description of the Related Art

In general, timing analysis for semiconductor chip designs follows one of two modes. Full statistical libraries can be deployed for cells in a design; however, this approach is computationally expensive and requires that each cell be very well characterized before analysis can be performed. On the other hand, on-chip variation ("OCV") techniques rely on a global timing margin for a design. While this latter approach is simple and familiar to many designers, the empirically-based margins for a design may fail to correctly capture and benefit from design-specific characteristics that might otherwise conserve layout space, power, and so forth.

There remains a need for timing analysis techniques that provide design-specific results without requiring the overhead of full statistical libraries.

SUMMARY

A statistical on-chip variation approach to timing analysis permits the automated or semi-automated selection of design-specific margins without requiring complex statistical libraries. By separately addressing the impact of random and systematic variations on timing, a design-specific margin can be obtained and used in downstream OCV analysis. In addition, where statistical libraries are available for some portions of a design, these can be incrementally included in the timing analysis to obtain more accurate results.

In one aspect, a method that is disclosed herein includes receiving a timing requirement for a timing path in a chip design; estimating a first timing effect on the timing path that accounts for a random variation occurring independent of location within the chip design; estimating a second timing effect on the timing path that accounts for a systematic variation having a spatial correlation within the chip design; and selecting a margin for the chip design that satisfies the timing requirement after adjusting the timing path for the first timing effect and the second timing effect.

The timing path may include a plurality of path delays, each one of the plurality of path delays including at least one cell delay and at least one wire delay. Estimating a second timing effect may include creating a spatial grid for the chip design; and creating a correlation matrix for the spatial grid that asserts a positive correlation and a correlation distance for regions of the spatial grid that follow a power mesh of the chip design. Estimating the second timing effect may include evaluating one or more spatial characteristics of a power drop across a power grid of the chip design. Estimating the first timing effect may include applying statistical static timing analysis to a path delay calculation for the timing path. Estimating the first timing effect may include applying a formula for one or more cells within the chip design that do not have a statistical library available. Estimating at least one of the first timing effect and the second timing effect may include conditionally applying a statistical library for a cell of the chip design if the statistical library is available. Estimating at least one of the first timing effect and the second timing effect may include generating a distribution of possible values for the timing path. The systematic variation may include an IR drop across a chip fabricated according to the chip design. The systematic variation may include an oxide thickness across a chip fabricated according to the chip design. The random variation may include a variation in dopant concentration. The timing path may include at least one of a setup time and a hold time. The timing requirement may be determined according to a clock speed for the chip design. The method may include applying the margin to an on-chip variation analysis of the chip design in order to verify timing, thereby providing a verified chip design, and fabricating a chip from the verified chip design.

In one aspect, a computer program product that is disclosed herein performs the steps of receiving a timing requirement for a timing path in a chip design; estimating a first timing effect on the timing path that accounts for a random variation occurring independent of location within the chip design; estimating a second timing effect on the timing path that accounts for a systematic variation having a spatial correlation within the chip design; and selecting a margin for the chip design that satisfies the timing requirement after adjusting the timing path for the first timing effect and the second timing effect.

Estimating a second timing effect may include creating a spatial grid for the chip design; and creating a correlation matrix for the spatial grid that asserts a positive correlation and a correlation distance for regions of the spatial grid that follow a power mesh of the chip design. Estimating the second timing effect may include evaluating one or more spatial characteristics of a power drop across a power grid of the chip design. Estimating the first timing effect may include applying statistical static timing analysis to a path delay calculation for the timing path. Estimating at least one of the first timing effect and the second timing effect may include conditionally applying a statistical library for a cell of the chip design if the statistical library is available. Estimating at least one of the first timing effect and the second timing effect may include generating a distribution of possible values for the timing path.

In one aspect, a system that is disclosed herein comprises a processor and a memory, the memory storing a computer program to perform the steps of estimating a first timing effect on the timing path that accounts for a random variation occurring independent of location within the chip design; estimating a second timing effect on the timing path that accounts for a systematic variation having a spatial correlation within the chip design; and selecting a margin for the chip design that satisfies the timing requirement after adjusting the timing path for the first timing effect and the second timing effect.

Estimating a second timing effect may include, creating a spatial grid for the chip design; and creating a correlation matrix for the spatial grid that asserts a positive correlation and a correlation distance for regions of the spatial grid that follow a power mesh of the chip design. Estimating the second timing effect may include evaluating one or more spatial characteristics of a power drop across a power grid of the chip design. Estimating at least one of the first timing effect and the second timing effect may include conditionally applying a statistical library for a cell of the chip design if the statistical library is available. Estimating at least one of the first timing effect and the second timing effect may include generating a distribution of possible values for the timing path.

In one aspect, a method that is disclosed herein includes receiving a chip design having a timing requirement; performing an on chip variation analysis to find a number of worst paths in the chip design having a worst timing; adjusting a timing path for each one of the number of worst paths using a statistical analysis, thereby providing a plurality of adjusted timing paths for the number of worst paths; and selecting a margin for the chip design such that the plurality of adjusted timing paths meet the timing requirement.

The number of worst paths may include a representative sampling of paths having a worst slack. The method may include receiving a fixed margin for the chip design and reporting a difference between the fixed margin and the margin selected based upon the plurality of adjusted timing paths. The statistical analysis independently may account for random variations uncorrelated to location within the chip design. The statistical analysis independently may account for systematic variations that are correlated to location within the chip design. The timing path may include one or more of a setup time and a hold time. The timing requirement may be based upon a clock speed. The plurality of adjusted timing paths may include a distribution of values. The method may include applying the margin to an on-chip variation analysis of the chip design in order to verify timing, thereby providing a verified chip design, and fabricating a chip from the verified chip design.

In one aspect, a computer program product that is disclosed herein performs the steps of receiving a chip design having a timing requirement; performing an on chip variation analysis to find a number of worst paths in the chip design having a worst timing; adjusting a timing path for each one of the number of worst paths using a statistical analysis, thereby providing a plurality of adjusted timing paths for the number of worst paths; and selecting a margin for the chip design such that the plurality of adjusted timing paths meet the timing requirement.

The number of worst paths may include a representative sampling of paths having a worst slack. The computer program product may include computer executable code that performs the step of receiving a fixed margin for the chip design and reporting a difference between the fixed margin and the margin selected based upon the plurality of adjusted timing paths. The statistical analysis independently may account for random variations uncorrelated to location within the chip design. The statistical analysis may independently account for systematic variations that are correlated to location within the chip design. The plurality of adjusted timing paths may include a distribution of values.

In one aspect, a system that is disclosed herein comprises a processor and a memory, the memory storing a computer program to perform the steps of performing an on chip variation analysis to find a number of worst paths in the chip design having a worst timing; adjusting a timing path for each one of the number of worst paths using a statistical analysis, thereby providing a plurality of adjusted timing paths for the number of worst paths; and selecting a margin for the chip design such that the plurality of adjusted timing paths meet the timing requirement.

The number of worst paths may include a representative sampling of paths having a worst slack. The program may perform the step of receiving a fixed margin for the chip design and reporting a difference between the fixed margin and the margin selected based upon the plurality of adjusted timing paths. The statistical analysis independently may account for random variations uncorrelated to location within the chip design. The statistical analysis independently may account for systematic variations that are correlated to location within the chip design.

In one aspect, a method that is disclosed herein includes receiving a chip design having a plurality of timing paths and a timing requirement; analyzing each one of the plurality of timing paths to determine a distribution of possible values for a delay of the timing path; selecting a margin for each one of the plurality of timing paths based upon the distribution of possible values for the delay of the timing path, thereby providing a plurality of margins for the chip design; and applying the plurality of margins to a timing analysis of the chip design.

Applying the plurality of margins may include using on-chip variation analysis with a selected one of the plurality of timing paths and a selected one of the plurality of margins on a path-specific basis. Analyzing each one of the plurality of timing paths may include determining an effect of random variations on the timing path, the random variations being uncorrelated to location within the chip design. Analyzing each one of the plurality of timing paths may include determining an effect of systematic variations on the timing path, the systematic variations being spatially correlated to location within the chip design. Analyzing each one of the plurality of timing paths may include conditionally applying a statistical library for at least one cell of the chip design if the statistical library is available. The statistical library may be a statistical static timing analysis library for the at least one cell. The method may include applying the timing analysis to verify the chip design, thereby providing a verified chip design, and fabricating a chip from the verified chip design. At least one of the plurality of timing paths may include a plurality of timing paths, each one of the timing paths further including at least one wire delay and at least one cell delay.

In one aspect, a computer program product that is disclosed herein performs the steps of analyzing each one of the plurality of timing paths to determine a distribution of possible values for a delay of the timing path; selecting a margin for each one of the plurality of timing paths based upon the distribution of possible values for the delay of the timing path, thereby providing a plurality of margins for the chip design; and applying the plurality of margins to a timing analysis of the chip design.

Applying the plurality of margins may include using on-chip variation analysis with a selected one of the plurality of timing paths and a selected one of the plurality of margins on a path-specific basis. Analyzing each one of the plurality of timing paths may include determining an effect of random variations on the timing path, the random variations being uncorrelated to location within the chip design. Analyzing each one of the plurality of timing paths may include determining an effect of systematic variations on the timing path, the systematic variations being spatially correlated to location within the chip design. Analyzing each one of the plurality of timing paths may include conditionally applying a statistical library for at least one cell of the chip design if the statistical library is available. The statistical library may be a statistical static timing analysis library for the at least one cell.

In one aspect, a system that is disclosed herein comprises a processor and a memory, the memory storing a computer program to perform the steps of receiving a chip design having a plurality of timing paths and a timing requirement; analyzing each one of the plurality of timing paths to determine a distribution of possible values for a delay of the timing path; selecting a margin for each one of the plurality of timing paths based upon the distribution of possible values for the delay of the timing path, thereby providing a plurality of margins for the chip design; and applying the plurality of margins to a timing analysis of the chip design.

Applying the plurality of margins may include using on-chip variation analysis with a selected one of the plurality of timing paths and a selected one of the plurality of margins on a path-specific basis. Analyzing each one of the plurality of timing paths may include determining an effect of random variations on the timing path, the random variations being uncorrelated to location within the chip design. Analyzing each one of the plurality of timing paths may include determining an effect of systematic variations on the timing path, the systematic variations being spatially correlated to location within the chip design. Analyzing each one of the plurality of timing paths may include conditionally applying a statistical library for at least one cell of the chip design if the statistical library is available. The statistical library may be a statistical static timing analysis library for the at least one cell.

BRIEF DESCRIPTION OF THE FIGURES

The invention and the following detailed description of certain embodiments thereof may be understood by reference to the following figures.

DETAILED DESCRIPTION

The following disclosure relates generally to systems and methods for deriving design-specific margins for use in on-chip variation ("OCV") analysis of a chip design.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" is intended to mean "and/or" unless otherwise stated to the contrary. Also, use of the "a" or "an" are employed to describe elements and components of the invention. Thus in the foregoing description references to the singular ("a", "an", "the", "one", etc.) are also intended to refer to the plural unless otherwise stated or clear from the context.

The Figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention. Reference will now be made in detail to several embodiments, examples of which are illustrated in the accompanying figures. It is noted that wherever practicable similar or like reference numbers may be used in the figures and may indicate similar or like functionality. The figures depict embodiments of the present invention for purposes of illustration only, and are not intended to limit the scope of this disclosure in any manner. One skilled in the art will readily recognize that alternative embodiments of the structures and methods illustrated herein may be employed without departing from the principles described herein.

Figure 1:
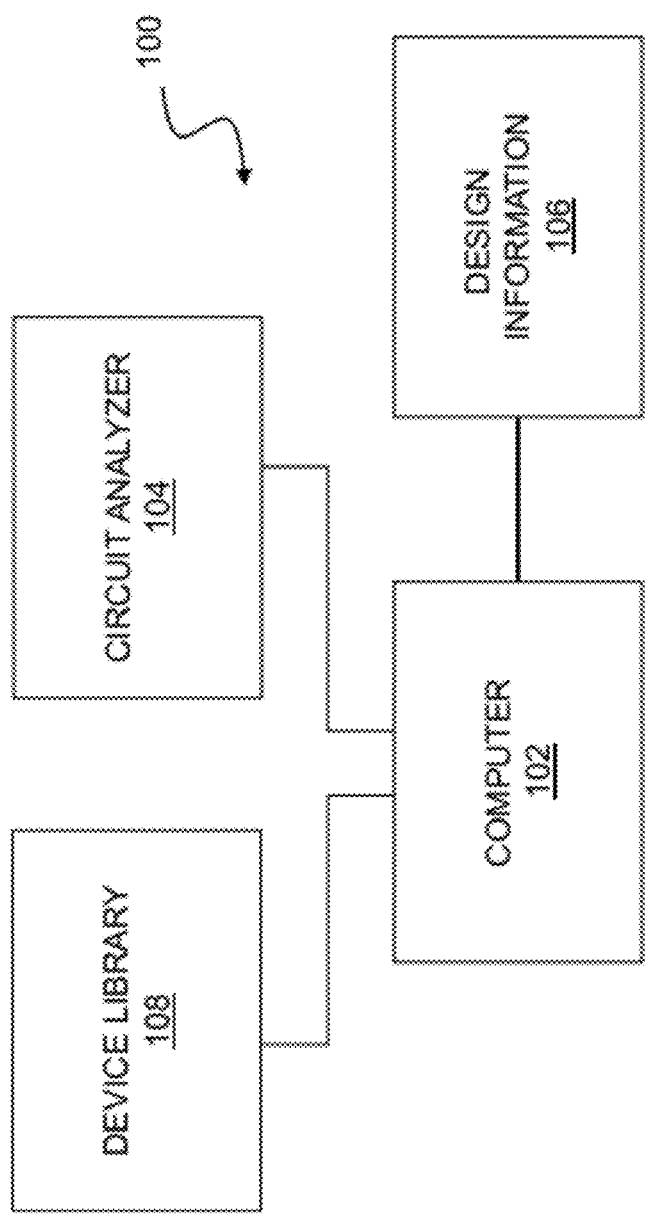
FIG. 1 is a block diagram of an electronic design automation system.

FIG. 1 is a block diagram illustrating an electronic design automation system 100. A computer 102 executes a circuit analyzer 104 for generating device models for circuits stored in a device library 108 and for simulating the operation and performance of an electrical circuit under design (referred to generally herein as a "circuit" or "design"). The computer 102 receives design information 106 such as a netlist of transistors and interconnections or any other suitable model corresponding to the design. The computer 102 retrieves corresponding models from the device library 108, and executes a design simulation using the circuit analyzer 104. The circuit analyzer 104, the design information 106, and, the device library 108 may reside in a memory internal or external to the computer 102. In general, the computer 102 may be any computer such as a laptop, desktop, workstation, or other computing device, processor, group of processors or other computing resource(s) or the like suitable for timing analysis as generally described herein.

The circuit analyzer 104 may generate a model for the design that captures various timing effects and variations within a design. In general, timing for a design depends on temperature, voltage, and manufacturing processes, with each of these factors having an affect on timing that may vary differently for random variations (i.e., variations that are not spatially correlated within a design) and systematic variations (i.e., variations that are spatially correlated). By way of example, IR drop along power rails is known to be a dominant voltage factor affecting timing, and this affect is spatially correlated to the power grid within a design. Conversely, variations in dopant concentration may appear randomly within a design, thus having little or no spatial correlation across an entire chip. A number of techniques for addressing timing variations are available for use in the circuit analyzer 104, as described more generally below.

Figure 2:
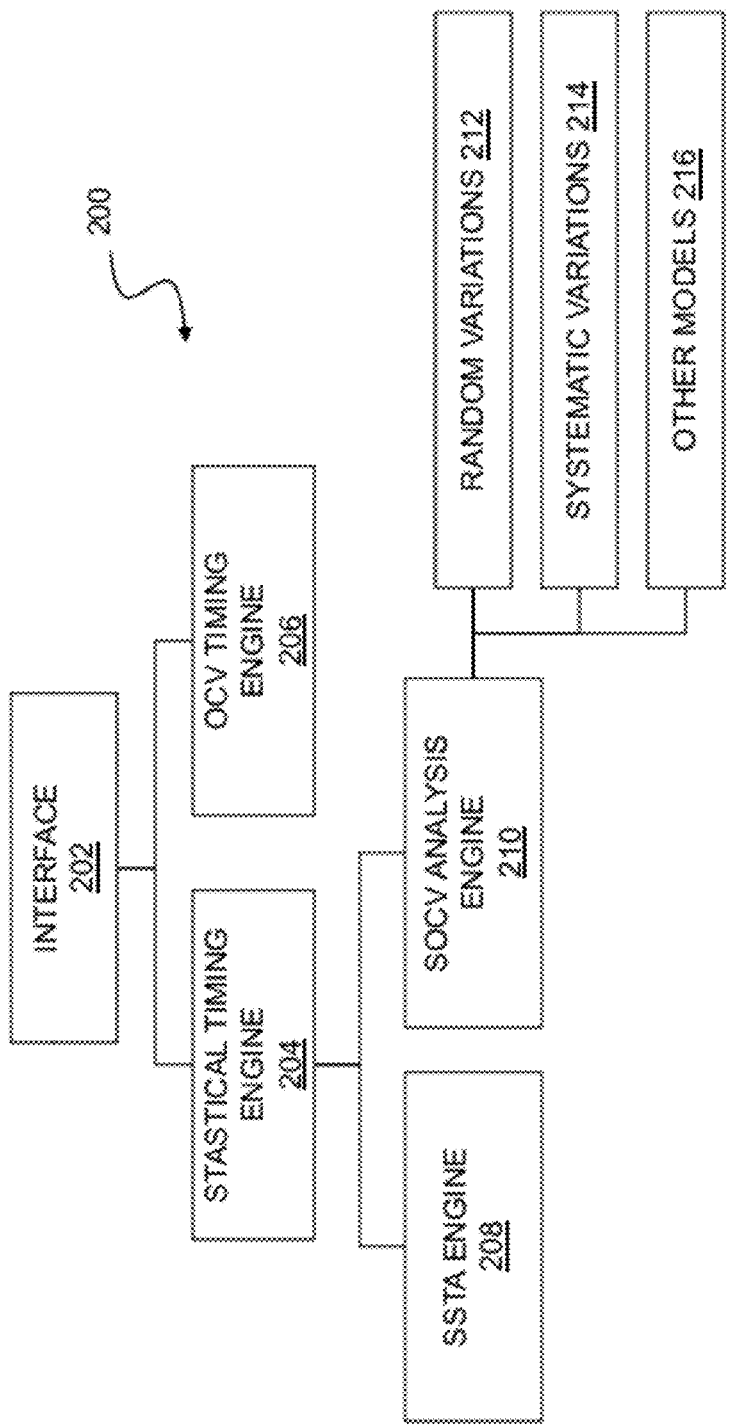
FIG. 2 is a functional block diagram of a circuit analyzer of the electronic design automation system of FIG. 1.

FIG. 2 is a functional block diagram of a circuit analyzer of the electronic design automation system of FIG. 1. The circuit analyzer 200, which may be for example the circuit analyzer 104 described above, may include an interface 202, a statistical timing engine 204, and an OCV timing engine 206.

The interface 202 may be any suitable interface for accessing and controlling the OCV timing engine 206 and the statistical timing engine 204, as well as presenting designs for timing analysis and compiling and reporting results from timing analysis. This may include, for example, an application programming interface that can be used by other software, and/or a user interface such as a graphical user interface or a command line interface. In one aspect, the interface 202 may include a command line interface to one or more Tool Command Language ("Tcl") scripts or the like that control access to the timing engines. The interface 202 may also, or instead, include a graphical user interface that provides a variety of visual tools for performing timing analysis and evaluating results. In general, statistical analysis results such as those from the statistical timing engine 204 can help tighten on-chip variation (OCV) margins used in deterministic analysis and optimization by the OCV timing engine 206. The interface may also include any software or other components suitable for storing results from and/or passing data between the statistical timing engine 204 and the OCV timing engine 206.

In general, an OCV timing engine 206 applies predetermined timing margins, or simply "margins", to a design to ensure sure a chip fabricated from the design will function as desired. In a conventional OCV system, the margin is selected globally for a design according to, e.g., foundry specifications, empirical designer selections, and the like. Once a margin is selected, designs can be analyzed to see if timing paths within the design meet the margin, which is typically provided as a fixed, +/−x % range about the clock rate for the design. When evaluating a design, a calculated timing path can be compared to the margin for the design to arrive at a pass/fail result, according to which a design can be accepted for fabrication or revised to bring timing paths within the margin. This OCV analysis is well known to designers and provides a very tractable, quantitative process for evaluating new designs. However, the margin for a design generally fails to accurately capture the full range of likely variations due to, e.g., systematic and random variations in a design or differences between the effect of these variations on setup times and the effect of these variations on hold times. Thus it is not uncommon for empirically selected margins to result in over-design of a chip, resulting in a chip for which all timing paths have well-beyond the needed slack to operate correctly at clock speed. As will be described in greater detail below, a statistical timing engine 204 may be employed to refine margins on a design-specific basis, and to provide these refined margins to the OCV timing engine 206 for use in timing checks for the design.

The statistical timing engine 204 may include a variety of statistical timing tools. For example, a statistical static timing analysis ("SSTA") engine 208 may receive process variation data and the like from a foundry representing various process parameters to be modeled statistically. Process variation can affect device parameters and interconnect dimensions such as width, thickness, and interlayer dielectric thicknesses, thus affecting timing. The process variation data may be presented in any suitable format, such as a Statistical Spice model, and may be categorized as global and local. Generally, global variations include die-to-die, wafer-to-wafer and lot-to-lot variations for a fabrication process that might affect timing for a design, while within-die variations are referred to as local variations. Additionally, for local variations, different parameters have different behavior. For example oxide thickness mostly has systematic variation, while the number and physical distribution of dopants may have random behavior. Both global and local (including systematic and random) variations may be modeled by the SSTA engine 208 provided that adequate statistical models are available. Typically, the SSTA engine 208 also uses gate modeling data and interconnect modeling data from a device library, including sensitivity information of design components (e.g., devices and interconnects) to process variations. The SSTA engine 208 may perform the SSTA using a variety of well-known approaches including path based and block based approaches. For all the approaches, the SSTA engine 208 may process correlations, Gaussian distribution assumptions, statistical min/max operations, slew/capacitance variation effects, environmental variations, and the like. The output of the SSTA engine 208 may include criticality and sensitivity data, delay/slack probability density function data, and clock tree analysis data for some or all of the design components (paths, nodes, etc.) and the circuit under design itself. This data may facilitate estimating the design parametric yield and enabling performance/yield tradeoff during circuit design. The SSTA engine 208 may evaluate the criticality of paths statistically or deterministically or both. The path criticality can be combined with delay sensitivity to help determine variability bottlenecks in designs and drive statistical optimization. The SSTA engine 208 may perform statistical static timing analysis that evaluates correlations and propagation of distribution under min/max operations. The delay/slack correlation may be due to correlation between process parameters, or due to path sharing in static timing analysis.

It will be understood that some or all of the analysis described above depends upon the availability of suitable statistical models of cells and other design elements that are to be analyzed. As described herein, the SSTA engine 208 may be employed incrementally to provide statistical static timing analysis where suitable statistical libraries and/or computing resources are available, while relying on the statistical OCV engine 210 to provide statistical analysis of other timing paths, or portions of timing paths, within a design.

The statistical OCV analysis engine 210 may apply any of a variety of techniques to statistically evaluate timing without requiring the use of SSTA and its related, detailed statistical models. This includes, for example random variation models 212, systematic variation models 214, and other models 216. Random variation models 212 may account for the affects of random variations on timing. Random variations may include any variations not correlated to location within a design such as variations due to dopant concentrations, temperature, and so forth. In general, random variations can be modeled according to known affects. For example, the effects of random variations tend to cancel over long setup paths, but they do not cancel on short hold paths. These affects can be suitably modeled to adjust a timing path and provide a range or other distribution of values due to random effects. Similarly, systematic variations are generally correlated to location within a design, and have relatively well known effects. Systematic variation models 214 can be modeled according to, e.g., IR drop along power rails as generally described below. Any other models 216 may also be employed by a statistical OCV analysis engine 210, including models based upon approximations, formulas (e.g., delay and output slope as a function of input slope and load), or any other static timing analysis or other techniques that can be employed to adjust timing paths within a design for a chip.

Some variations, such as oxide thickness, may in various embodiments be suitably treated as random, systematic, or global. That is, oxide thickness may not vary significantly within a chip, but it may vary significantly from chip to chip in a way that affects timing. This random process variable causes random variations in timing; however, the effect of oxide thickness is typically completely correlated or nearly completely correlated within a single chip or design. Thus the affect of oxide thickness may be suitably modeled using the techniques described herein with a random variable that is correlated across an entire design, or separately as a global variable for a design. All such variations that would be known to one of ordinary skill in the art (exclusive of full statistical models for SSTA) may suitably be employed with the statistical OCV analysis engine 210 as described herein.

As described in greater detail below, the systems described above may be used to derive design-specific margins for use in OCV timing analysis of a design for a chip. A number of relevant terms are set out with reference to FIGS. 3 and 4 below, which are provided for purposes of illustration only, and in no way limit the generality of the systems and methods disclosed herein.

Figure 3:
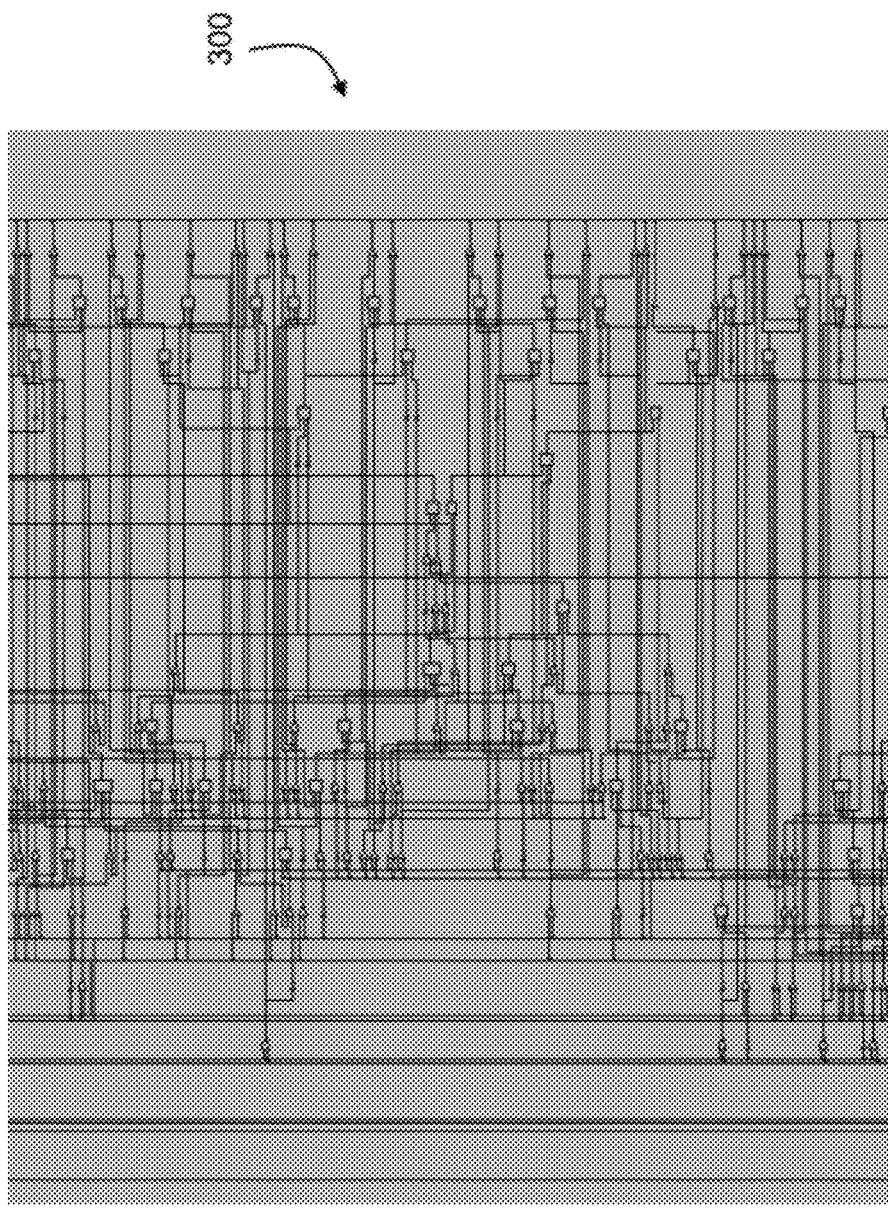
FIG. 3 shows a chip design.

FIG. 3 shows a design for a chip. The design 300 may include any number of wires, gates, cells and the like that make up various paths interconnecting points within the design. While FIG. 3 depicts a circuit diagram, it will be understood that the design 300 may be internally (i.e., in data structures) and/or externally (i.e., in a display, printout, or the like) represented in a wide variety of formats such as functional diagrams, circuit designs, physical layouts, floor plans, netlists, masks, simulation models, I/O diagrams, and so forth. Any and all such representations may constitute the design 300 in various forms of abstraction. Ultimately, a design may be fabricated as a physical chip or the like that embodies the design in a working electronic device. In one embodiment, a netlist instantiation of the design 300 is employed for timing analysis as described herein; however, it will be understood that other representations of the design 300 may also or instead be employed.

Figure 4:
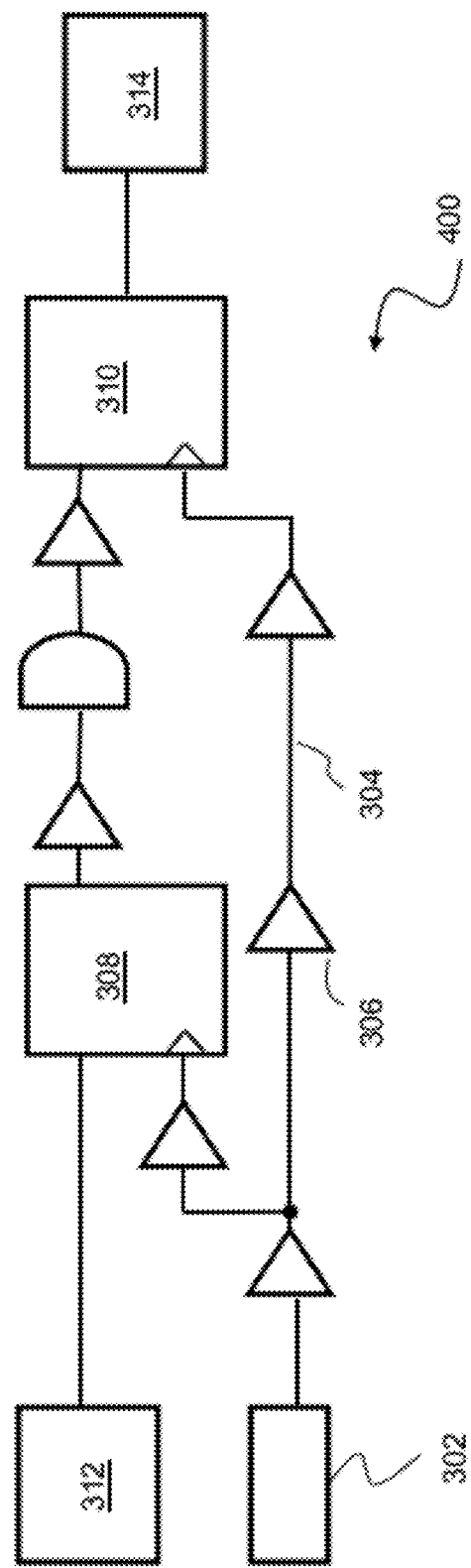
FIG. 4 shows a timing path in a chip design.

FIG. 4 shows a timing path in a design for a chip. In general the timing path 400 follows a discrete physical path within the design 300 of FIG. 3, and traverses any number of wires 304, cells 306, flipflops (including, e.g., a launch flipflop 308 and a capture flipflop 310), and the like. Thus in one aspect the timing path 400 may be viewed as a physical path through a design, while in another aspect the timing path 400 may be viewed as a sum of path delays attributable to the design components traversed by the physical path, where each path delay may further include wire delays, cell delays, and the like. In the former sense, a timing path includes the physical components and wires that form a physical path. In the latter sense, the timing path includes the delays attributable to the various components as well as setup times, hold times, and the like required for proper functional interaction thereof. In general, the term timing path is used interchangeably to refer to either aspect unless a different meaning is explicitly provided or otherwise clear from the context. During a timing check, a timing requirement may be determined according to, e.g., a clock rate of a clock 302 for the design 300 or some other timing parameter, and the timing path 400 is evaluated to determine whether a signal can traverse the timing path 400 (and the intervening logic, wires, etc.) from an input 312 to an output 314 within the timing requirement. A calculation delay for the timing path 400 represents the amount of time calculated for a signal to go from a launch flipflop 308 to a capture flipflop 310.

Figure 5:
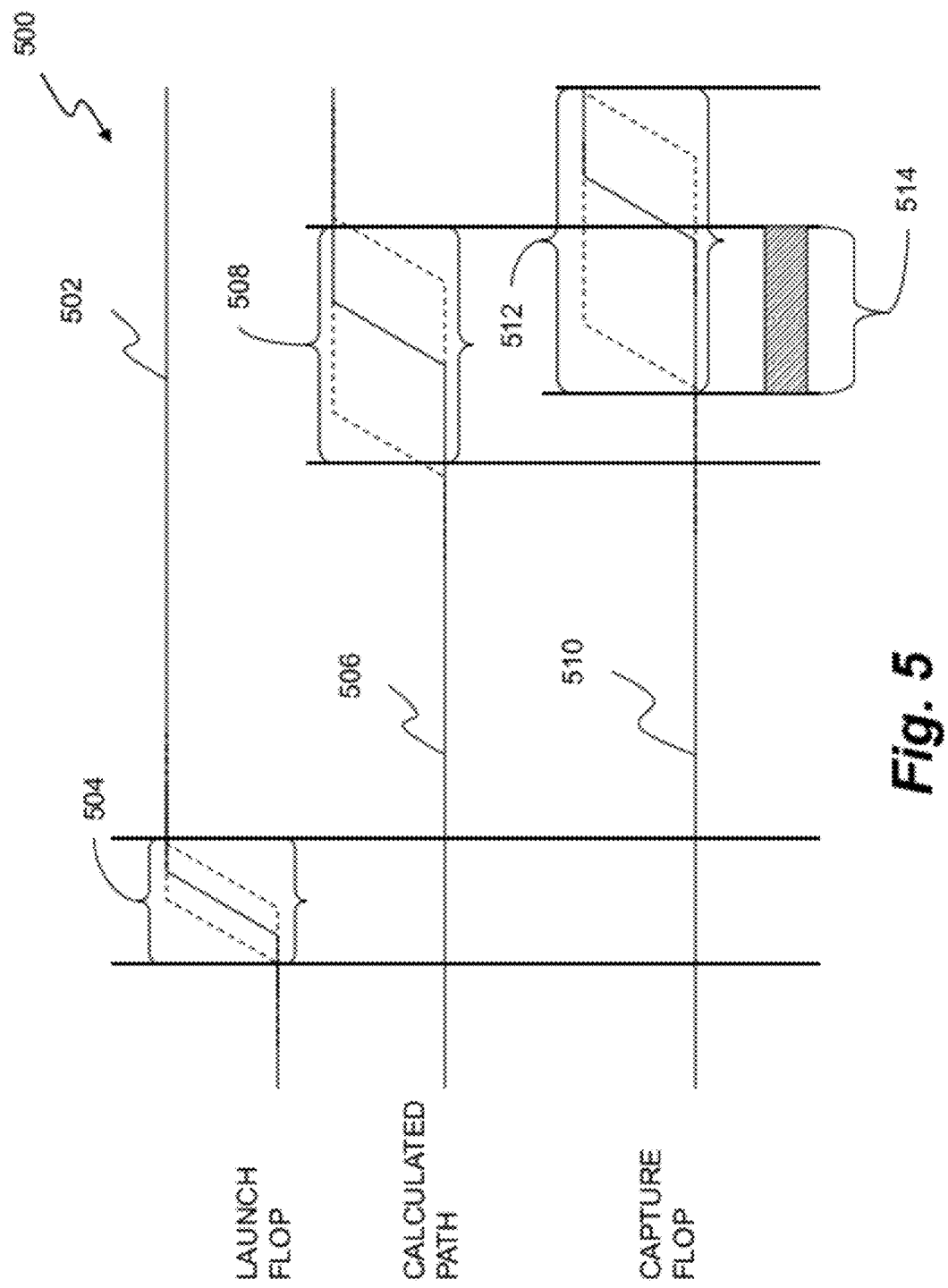
FIG. 5 shows a timing diagram for a timing path.

FIG. 5 shows a timing diagram 500 for a timing path. While a calculated delay approximates timing for an actual chip, the path delay for a timing path may be affected by any number of factors such as the random and systematic variations in a design as generally discussed above. As a result, a launch clock 502 may actually arrive at a launch flipflop within a first window 504. Similarly, the time for a resulting signal 506 to reach a capture flop may vary within a second window 508, and the capture clock 510 may actually arrive at a capture flipflop within a third window 512. If there is an overlap 514 among these windows, a timing violation has occurred and it may be presumed that a chip fabricated from the design will fail to operate properly at clock speed. Conversely, if there is no overlap, it may be presumed that a chip fabricated from the design will operate properly at clock speed, and upon this verification a chip may be confidently fabricated from the design. In an OCV analysis as generally described above, it is assumed that the windows 504, 508, 512 have width that is a fixed percentage of the clock speed, or a fixed percentage of some other timing value within the design. In an SSTA analysis as generally described above, the windows 504, 508, 512 may be calculated as distributions of possible widths according to detailed statistical libraries for each component within the timing path.

It will be understood that the chip design 300, timing path 400, and timing diagram 500 in FIGS. 3-5 are simplified examples provided only for purposes of illustration, and are in no manner intended to limit the scope or generality of the systems and methods described herein, which may be applied to designs of any size and complexity, and may be suitable for example in large designs where use of a substantial number of complex statistical models is computationally impractical. In practice, a timing analysis may be applied to a chip design 300 of any size, and may include evaluation of some or all of the potentially numerous timing paths 400 within the design 300. Having described the general nature of timing analysis and a computer system for same, a number of processes and uses for statistical on-chip variation analysis are now described in greater detail.

Figure 6:
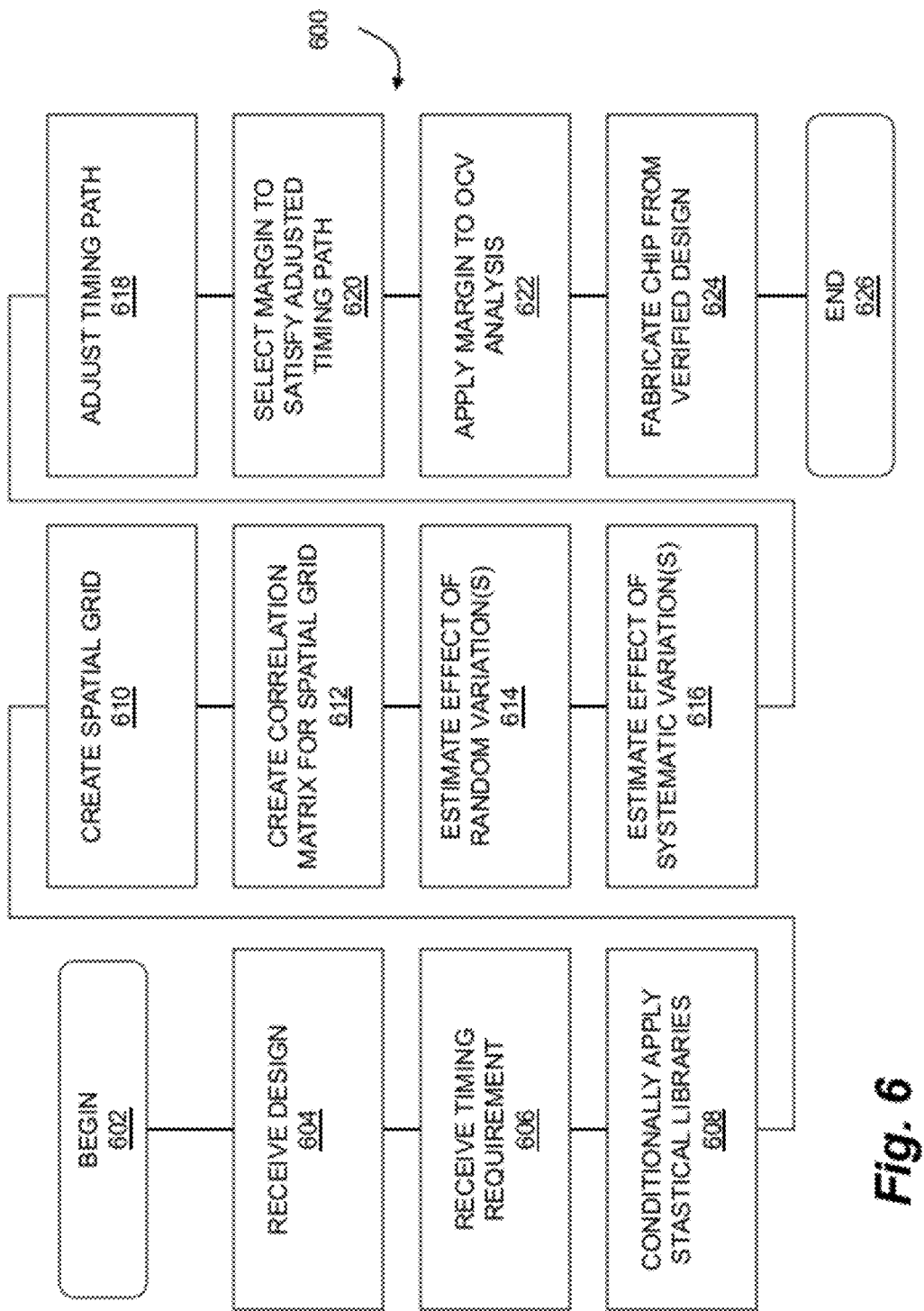
FIG. 6 shows a process for timing analysis.

FIG. 6 shows a process for timing analysis. While various manual steps are described below in which user may control processing or provide variables for use in the process 600, it will be understood that in one aspect the foregoing process 600 provides an automated technique for deriving design-specific margins that can be used in an OCV timing analysis. The process 600 may begin with receiving a design as shown in step 604. This may include, for example, loading netlists, libraries, constraints, placement information, and any other design representations and/or design information needed for timing analysis into a computer from a network location, disc drive, or other volatile or non-volatile memory. This may include information from a proprietary design environment, or raw design data according to industry standards (e.g., .lib files, netlist files, SDC files, DEF files, and so forth). Receiving a design may also include performing any design checks necessary or desirable for proper functioning of downstream timing analysis, as well as conditioning the data and timing engines for proper interaction (e.g., by appropriately configuring time borrowing, crosstalk, setup/hold derating, and the like). It will be understood that receiving data, as used herein, may include retrieving data from any remote location, providing data from within memory or other local data source, and the like. The term "receiving" is intended to signify that the data is available to and provided to the process 600, and does not signify any particular form of data storage or delivery.

As shown in step 606, the process 600 may include receiving a timing requirement. This may include a timing requirement expressed as a clock rate or clock speed for the design (e.g., frequency), or as an amount of time for a single clock cycle, or in any other manner suitable for determining a value or values to be applied to timing analysis for the design as generally described herein.

As shown in step 608, the process 600 may conditionally apply statistical libraries. This may include for example querying the SSTA engine for some or all of the cells in a design to determine whether a full statistical library is available. Where there is a suitable statistical library characterizing the cell, this may be used to calculate a path delay for the cell, or more typically for SSTA, a distribution of values for the path delay. It will be understood that a cell is, in general, any encapsulation of low-level layout into an abstract logic representation and may include without limitation simple cells such as Boolean logic (AND, OR, XOR, inverters, etc.), flipflops, gates and the like, as well as more complex cells such as adders, multiplexers, and the like. Thus the circuit analyzer as described herein may incrementally apply statistical libraries and SSTA where such libraries are available for cells in a design, advantageously permitting a designer to benefit from the improved accuracy of SSTA without requiring full characterization of all of the cells within a design. In one aspect, a user may, through the interface, control the conditions under which statistical libraries are applied. Thus a user may chose to use libraries whenever they are available, or the user may chose to use libraries for a particular set or subset of cells for which SSTA analysis is desired. In embodiments, other information may be conditionally incorporated into timing analysis. Thus for example a user may specify cell-specific deratings or other cell-specific information where such information is available for a design.

As shown in step 610, the process may create a spatial grid for the design. This may include creating a spatial grid such as that described below with reference to FIG. 7, which divides the design into a number of bins. In general, the row height and column width for the spatial grid may vary so that bins may be square or rectangular, with dimensions selected according to, e.g. a power grid for a design. In order to use the spatial grid for various calculations below, each bin may be assigned an index (e.g., (x,y)) and/or unique identification number for access during calculations, creation of a correlation matrix, and the like. In one embodiment, a user may manually create a spatial grid through the interface for the circuit analyzer. In another embodiment, the spatial grid may be created automatically based upon the location of power rails which may be determined using any number of well known techniques to analyze either the layout (e.g., metallization width, length, layer, location, etc.) or metadata for the design and/or netlist. In another embodiment, grid creation may be semi-automated, such as by providing a minimum or maximum cell size, one or more specific cell locations, or the like, and having the circuit analyzer construct a compliant spatial grid.

As shown in step 612 a correlation matrix may be created for the spatial grid. In general, the correlation matrix provides a correlation between some or all of the bins in the spatial grid. In one embodiment, each such relationship may be expressed as a number between −1 (complete negative correlation) and 1 (complete positive correlation). The correlation may default to a completely uncorrelated state (correlation of zero for all bin-to-bin relationships). The correlation matrix may include separate variables for random and systematic variation. In general, random variations are uncorrelated; however, a user may wish to specify a correlation between bins under certain circumstances, such as where a functional cell spans two or more bins in the spatial grid. In general, systematic variations may be modeled by positively correlating adjacent bins along one or more power rails, which may be used to account for, e.g., IR drop along a power grid resulting from effects such as distance from a power source, leakage current, switching current, circuit power consumption, and so forth. While the correlation matrix may be applied to account for any number of other systematic variations with suitable adaptations to correlation values, IR drop is generally considered to have one of the most significant affects on timing and IR drop generally follows power rails across a design.

The correlation matrix for systematic variations may be populated using a variety of techniques. For example, a user may explicitly specify correlation on a bin-by-bin basis. In another embodiment, a user may specify a correlation distance that specifies a distance (e.g., as a multiple of grid size or cell size) at which the correlation between bins becomes zero (or substantially zero). In another embodiment, a user may specify exponential decay of correlation across a number of adjacent, collinear bins which may include a distance to zero correlation and a rate of decay for correlation. More generally, any technique for manually or automatically assigning correlation values to one or more bin-to-bin relationships may be suitably employed with the systems and methods described herein. Where a power grid is somewhat irregular or otherwise fails to align with the spatial grid, the correlation values may be averaged over the spatial grid in order to approximate IR drops.

As shown in step 614, the process 600 may estimate the effect of random variations on a timing path within the design.

As noted above, random variations generally occur independently from location within the chip design such as variations due to dopant concentration and so forth. The timing effect due to these variations is thus typically uncorrelated from bin to bin. Thus, each bin may be assigned a random value (such as from a statistical timer for the circuit analyzer) that accounts for random variations within that bin, and all cell delays within the bin may be adjusted accordingly. The random value may be, for example, a randomly selected percentage or sigma variation from a nominal value within some predetermined distribution. While the cell delays within a bin are generally 100% correlated to each other, these delays are completely uncorrelated to cell delays in adjacent bins, which are independently calculated with the random selected variable for that bin. When evaluating a timing path, the sums of these adjusted cell delays for a path, each of which may be a range or distribution of values, provide a range of values for the time a signal takes to traverse the timing path. It will be noted that a setup time for a timing path may be evaluated separately from a hold time for the timing path so that, as with the physical circuits that are being modeled, the random variations tend to cancel over long setup paths, accumulate over short hold paths, and otherwise follow the effects of random variations on timing for a design.

As shown in step 616, the process 600 may estimate the effect of systematic variations on a timing path within the design. Unlike random variations, the systematic variations in a chip design tend to be spatially correlated, such as along power rails or around cells with high power consumption. When estimating the effect of systematic variations, a random value assigned to a bin (such as by the statistical timer) creates a range of possible values for cell delays within the bin, and may also affect timing in other bins according to the degree of correlation expressed in the correlation matrix. Thus for example, the correlation matrix may contain values representing an exponential decay along the bins for a power rail over a certain distance. It will also be noted that there may be other systematic variations other than those related to the power grid, any of which can be accounted for by suitable bin-to-bin correlations within the correlation matrix. For example, oxide thickness may affect timing, and may vary from chip to chip within a fabrication process but not within a particular chip. Thus the affect of oxide thickness may, in one embodiment, be modeled as random variable having an effect that is positively and consistently correlated across an entire design.

In one aspect, a user may specify the weighting or allocation of random and systematic variations. This may include, for example only evaluating the effect of systematic variations (100% systematic, 0% random), only evaluating the effect of random variations (0% systematic, 100% random), equally weighting systematic and random variations (50% systematic, 50% random), or any ratio in between. Where a global design margin is being sought, the resulting margin will be correspondingly weighted to account for these variations.

As shown in step 618 the timing path may be adjusted according to the effects of random and systematic variations as determined above. In general, this includes combining the various cell delays into adjusted path delays, and finally an adjusted timing path. While numerous techniques exist for combining cumulative statistical variations such as ranges or distributions, the most direct technique is a min/max approach which establishes a range for the timing path spanning from the fastest cumulative path to the slowest cumulative path when accounting for all of the cell delays, wire delays, and so forth within the timing path.

As shown in step 620, a margin may be selected to satisfy the adjusted timing path. Having accumulated the various timing effects from variations within the design, selecting a corresponding margin can be a relatively straightforward step of selecting a window around the nominal time to traverse the timing path that spans from the slowest to the fastest adjusted value. While OCV margins are typically symmetrical, it will be understood that an asymmetrical margin may also be provided. It will also be understood that a buffer for the margin (e.g., +/−1%) may be provided beyond the timing window derived from the adjusted paths so that the design margin slightly exceeds the adjusted timing path values.

As shown in step 622, the margin may be applied to an OCV analysis, such as a conventional OCV analysis using the OCV analysis engine above, to verify timing for a chip design.

As shown in step 624, a chip, or more typically a number of chips on a wafer, may be fabricated from the verified design. It will be appreciated that numerous additional checks including design checks, timing checks, and other validation and verification procedures may be employed before fabricating the chip, and all such steps that would be readily apparent to one of ordinary skill in the art are intended to fall within the scope of this disclosure.

It will be understood that while a single process flow is depicted in FIG. 6, the process 600 may be repeated for some or all of the timing paths in a design, and results for different timing paths may be used individually, or they may be combined to derive a single OCV margin for a design. It will also be understood that multiple instances of the process 600 may be executed concurrently or sequentially according to the computer system being used and the nature of the timing analysis. In addition, while numerous discrete steps are shown, it will be appreciated that the order of the steps may be changed (such as by creating a spatial grid before conditionally applying statistical libraries), and any of the steps may be omitted or modified without varying from the scope of this disclosure. At the same time, any number of additional steps may be usefully added to the process 600 described above, such as the various additional process steps outlined below or other steps not specifically illustrated in the figures. All such modifications, additions, omissions, and the like are intended to fall within the scope of this disclosure.

Figure 7:
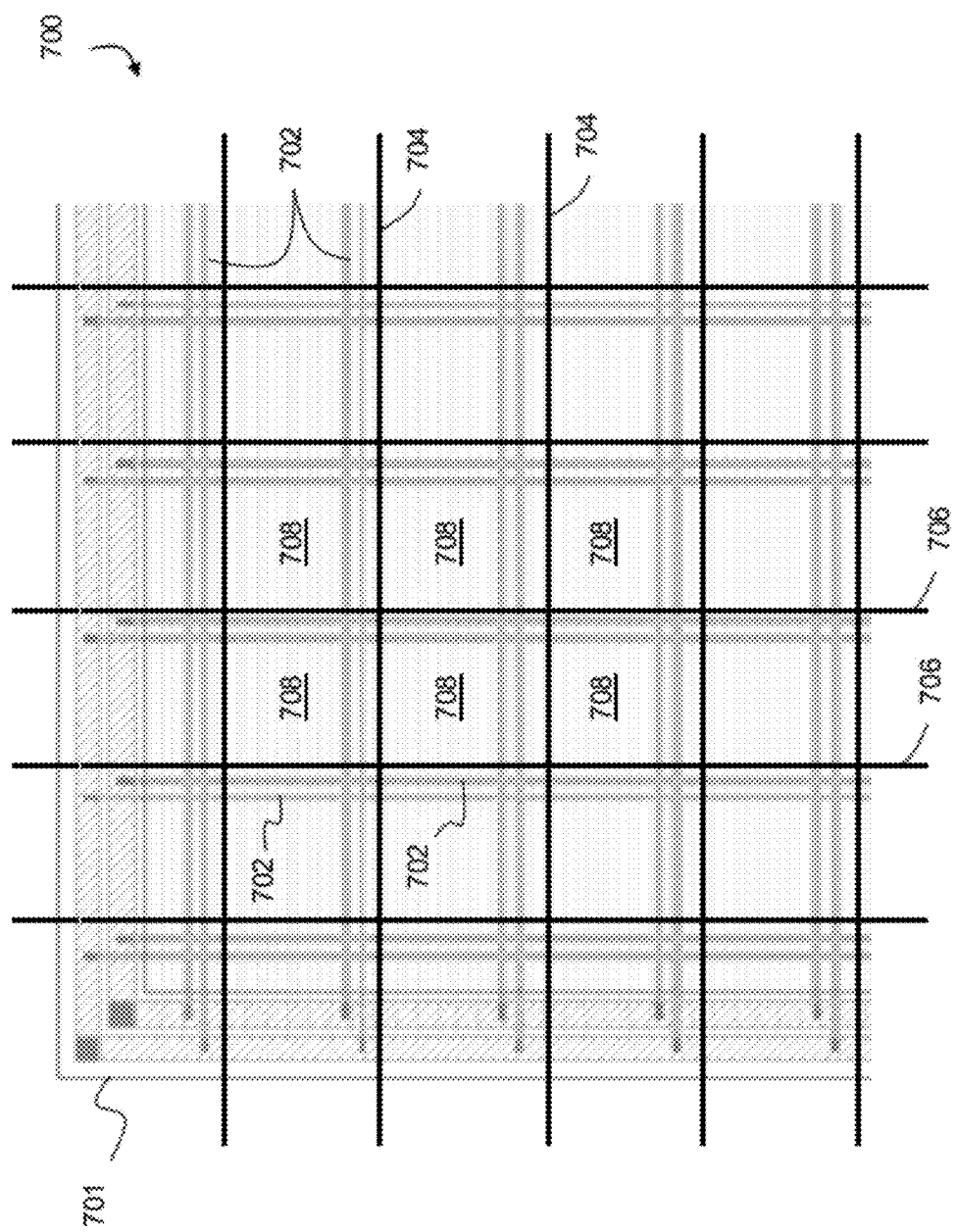
FIG. 7 shows a spatial grid for use in timing analysis.

FIG. 7 shows a spatial grid 700 for use in timing analysis that may be usefully employed, for example, in step 610 ("create spatial grid") of the process 600 described above. In general, a chip design 701 (only an upper, left-hand corner of which is depicted in FIG. 7) includes power rails 702 that typically form a regular horizontal and vertical pattern across a chip on one or more layers of the design 701. The power rails 702 serve to distribute power to various cells and other components of the design 701. The design 701 may be spatially divided using a grid of horizontal lines 704 and vertical lines 706 that separate the design 700 into a number of bins 708 that can be indexed, e.g., by column and row in the form (0,0), (0,1), . . . , (1,0), . . . (2,0), . . . (n,n). In a typical embodiment, the design may be divided into a 10×10 spatial grid (n=9), although the number and size of bins may depend upon the design 701. For example, if a design is 100 μm wide by 200 μm tall, a 10×10 spatial grid of bins 708 that measure 10 μm by 20 μm may be created. More generally, any regular or irregular spatial grid may be created through the interface to the circuit analyzer, such as by suitable command line entries or graphical interface tool interactions. In an embodiment (as described above), the spatial grid preferably corresponds to a power mesh (the power rails 702 in FIG. 7) of a design in order to permit accurate correlation of IR power drops from bin 708 to bin 708 along the power mesh.

Figure 8:
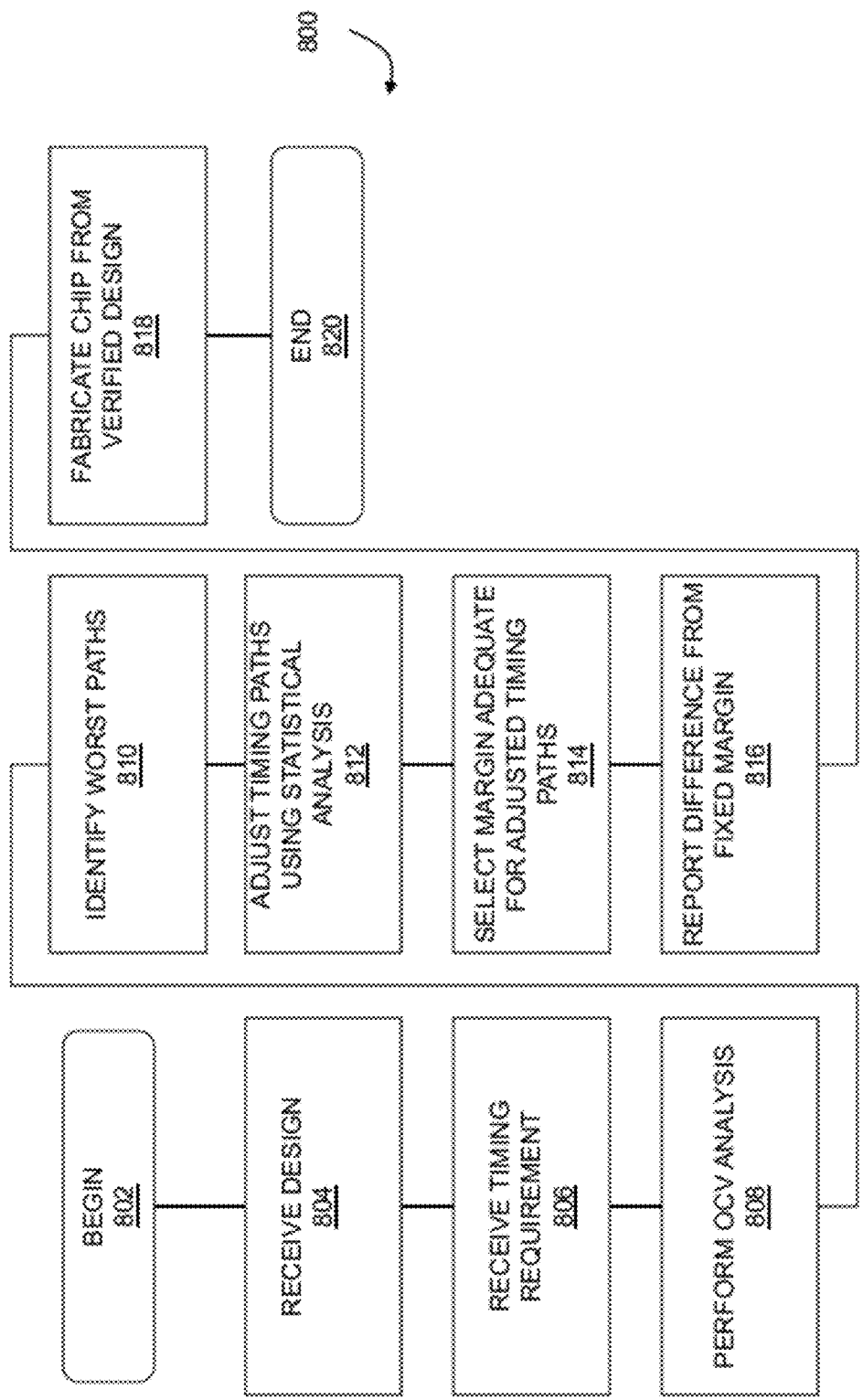
FIG. 8 shows a process for timing analysis.

FIG. 8 shows a process for timing analysis. In general, this process 800 provides an automated technique for determining OCV margins based upon a selection of the worst timing paths in a design, and an adjustment of these timing paths using the statistical methods described above. In other embodiments, the process 800 provides quantitative comparisons of timing for the worst paths to a fixed design margin. The method may being 802 with receiving a design as shown in step 804 and receiving a timing requirement as shown in step 806. These steps may, for example, be as generally described above with reference to FIG. 6.

As shown in step 808, an OCV analysis may be performed on the design to evaluate timing for a number of paths.

As shown in step 810, this nominal timing may be used to identify a number of worst paths that have the worst timing of the number of paths. The number of paths selected may be any number useful for characterizing timing paths in a design such as 5 paths, 10 paths, 20 paths, 50 paths, 100 paths, or any other suitable number of paths. In general the worst paths are those timing paths for the design having a nominal timing that exceeds a timing requirement by the greatest amount. This is generally referred to as slack—a figure of merit for timing that characterizes the extent by which actual timing exceeds a timing requirement dictated by a clock speed. Thus the worst paths may be those having the least slack (or possibly the largest negative slack). In an embodiment, the number of paths may be undetermined, and one or more criteria may be provided for path selection. Thus the number of paths may be all paths having a negative slack greater than some value, or all paths having more than some number of cells. More generally, the number of worst paths may be any representative sampling of worst paths, which may or may not include the actual worst path for a design.

As shown in step 812, the worst timing paths may be adjusted using the statistical analysis techniques described above. This may for example include conditionally applying SSTA libraries where available, and separately treating random and systematic variations for the timing path using a spatial grid and correlation matrix.

As shown in step 814, a margin may be selected for the design that is adequate for the adjusted timing paths, as also described for example with reference to the process 600 of FIG. 6.

As shown in step 816, a report may also be provided that summarizes or details differences between a fixed OCV margin for the design and the margin selected in step 814, or between the fixed OCV margin for the design and the timing for the adjusted timing paths, or some combination of these. This report may be generated for purposes of general evaluation, or for use in a manual fixed margin selection that is informed by the statistical timing analysis techniques described herein.

As shown in step 818, a chip may be verified using the margin selected in step 814, and the verified chip may be fabricated as generally described above with reference to the process 600 of FIG. 6.

The process may then end 820.

It will be understood that while a single process flow is depicted in FIG. 8, the process 800 may be repeated for some or all of the timing paths in a design, and results for different timing paths may be used individually, or they may be combined to derive a single OCV margin for a design. It will also be understood that multiple instances of the process 800 may be executed concurrently or sequentially according to the computer system being used and the nature of the timing analysis. In addition, while numerous discrete steps are shown, it will be appreciated that the order of the steps may be changed, and any of the steps may be omitted or modified without varying from the scope of this disclosure. For example, the process 800 may be usefully applied to a random sample of timing paths within a design without specific reference to whether they are the worst timing paths. As another example, once a margin is selected in step 814, the process 800 may proceed directly to verification of the design and fabrication of the chip. Conversely, step 814 and step 818 may be omitted, and the process may be employed simply for preparing a report on the differences between a fixed margin and the adjusted, worst timing paths. At the same time, any number of additional steps may be usefully added to the process 800 described above. All such modifications, additions, omissions, and the like are intended to fall within the scope of this disclosure.

Figure 9:
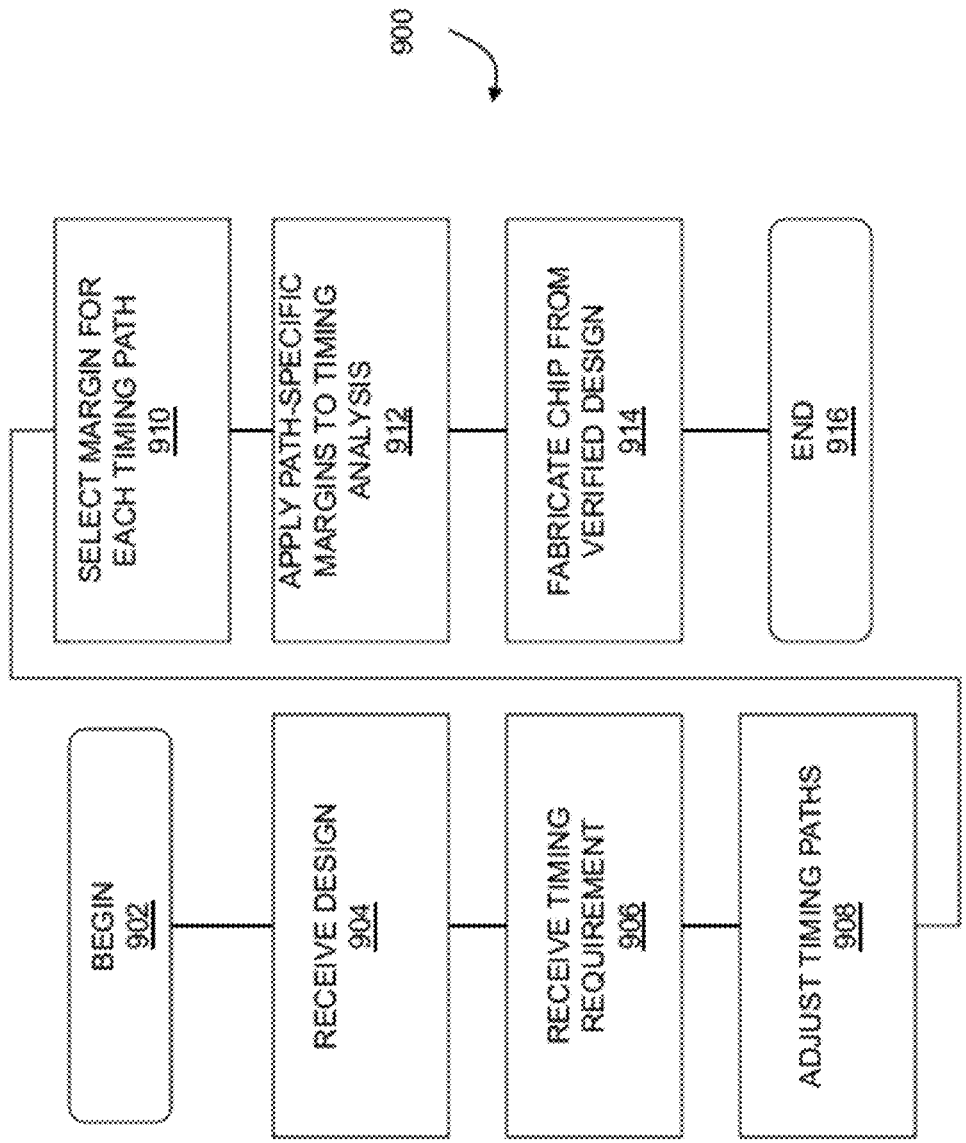
FIG. 9 shows a process for timing analysis.

FIG. 9 shows a process for timing analysis. In general, the process 900 of FIG. 9 provides a technique for determining and applying path-specific margins within a timing analysis. The method may begin 902 by receiving a chip design 904 and receiving a timing requirement for the chip design 906. A number of timing paths for the design may then be adjusted using the statistical timing techniques generally described above.

As shown in step 910, a margin may then be selected for each one of the number of timing paths, resulting in a number of path-specific margins for the design.

As shown in step 912, any or all of the path-specific margins may be used in an OCV or similar timing analysis to verify timing for each path using a path-specific margin for that path. In other embodiments, a global design margin may be used in combination with path-specific margins. Thus a fixed margin for the entire design may be used as a default, along with path-specific margins for some subset of the paths in the design such as the worst paths, the critical paths, the longest paths, or any combination of these and any other paths or type(s) of paths within the design.

It will be understood that while a single process flow is depicted in FIG. 9, the process 900 may be repeated for any number of different paths, types of paths, or groups of paths in a design, and results for different timing paths may be used individually, or they may be combined to derive a group of OCV margins for various path types or physical regions within a design. It will also be understood that multiple instances of the process 900 may be executed concurrently or sequentially according to the computer system being used and the nature of the timing analysis. In addition, while numerous discrete steps are shown, it will be appreciated that the order of the steps may be changed, and any of the steps may be omitted or modified without varying from the scope of this disclosure. For example, in step 910 a path-specific margin may be conditionally selected only if a path or the timing for the path meets predetermined criteria relating to, e.g., time, setup-hold window size, signal type, and so forth. At the same time, any number of additional steps may be usefully added to the process 900 described above, and all such modifications, additions, omissions, and the like are intended to fall within the scope of this disclosure.

It will be appreciated that the systems and methods described herein may be realized in hardware, software, or any combination of these suitable for a particular application. The hardware may include a general purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device that may be configured to process electronic signals. It will further be appreciated that the process may be realized as computer executable code embodied on a computer readable medium that, when executing on one or more computing devices, performs the recited steps. The computer executable code may, for example, be created using a structured programming language such as C, an object oriented programming language such as C++, or any other high-level or low-level programming language (including assembly languages, hardware description languages, and database programming languages and technologies) that may be stored, compiled or interpreted to run on one or more of the above devices, as well as heterogeneous combinations of processors, processor architectures, or combinations of different hardware and software. At the same time, processing may be distributed across a number of different computing devices in a number of ways, or all of the functionality may be integrated into a dedicated, standalone device or other hardware. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

What is claimed is:

1. A method comprising:
receiving, at one or more processors associated with one or more computer systems, a timing requirement for a timing path in a chip design;
estimating a first timing effect on the timing path that accounts for a random variation occurring independent of location within the chip design;
estimating a second timing effect on the timing path that accounts for a systematic variation within the chip design wherein one or more of the first and the second timing effect is a function of interconnect wiring; and
selecting a margin for the chip design that satisfies the timing requirement after adjusting the timing path for the first timing effect and the second timing effect, wherein estimating the second timing effect includes applying a correlation to a spatial partitioning of the chip design.

2. The method of claim 1 wherein the interconnect wiring connects transistors for the timing path in the chip design.

3. The method of claim 2 wherein the interconnect wiring is within one or more cells in the chip design.

4. The method of claim 1 wherein the estimating of one or more of the first timing effect and the estimating of the second timing effect includes capacitance variation for the interconnect wiring.

5. The method of claim 4 wherein the estimating of one or more of the first timing effect and the estimating of the second timing effect includes resistance variation for the interconnect wiring.

6. The method of claim 1 wherein the estimating of one or more of the first timing effect and the second timing effect includes crosstalk for the interconnect wiring.

7. The method of claim 1 wherein the spatial partitioning includes a plurality of bins, the correlation correlating a variation of a first of the plurality of bins with a variation of a second of the plurality of bins.

8. The method of claim 7 wherein the correlation is a function of distance between the first and the second of the plurality of bins along a power mesh of the chip design.

9. The method of claim 8 wherein the timing path includes a plurality of path delays, each one of the plurality of path delays including at least one cell delay and at least one wire delay.

10. The method of claim 9 wherein estimating the second timing effect includes:
creating a spatial grid for the chip design; and
creating a correlation matrix for the spatial grid that asserts a positive correlation and a correlation distance for regions of the spatial grid that follow the power mesh of the chip design.

11. The method of claim 1 wherein estimating the second timing effect includes evaluating one or more spatial characteristics of a power drop across a power grid of the chip design.

12. The method of claim 1 wherein estimating the first timing effect includes applying statistical static timing analysis to a path delay calculation for the timing path.

13. The method of claim 1 wherein estimating the first timing effect includes applying a formula for one or more cells within the chip design that do not have a statistical library available.

14. The method of claim 1 wherein estimating at least one of the first timing effect and the second timing effect includes conditionally applying a statistical library for a cell of the chip design if the statistical library is available.

15. The method of claim 1 wherein estimating at least one of the first timing effect and the second timing effect includes generating a distribution of possible values for the timing path.

16. The method of claim 1 wherein the systematic variation includes an IR drop across a chip fabricated according to the chip design.

17. The method of claim 1 wherein the timing path includes at least one of a setup time and a hold time.

18. The method of claim 1 further comprising applying the margin to an on-chip variation analysis of the chip design in order to verify timing, thereby providing a verified chip design, and fabricating a chip from the verified chip design.

19. A computer program product comprising computer executable code embodied in a non-transitory computer-readable storage medium that, when executing on one or more computing devices, performs the steps of:
receiving a timing requirement for a timing path in a chip design;
estimating a first timing effect on the timing path that accounts for a random variation occurring independent of location within the chip design;
estimating a second timing effect on the timing path that accounts for a systematic variation within the chip design wherein one or more of the first and the second timing effect is a function of interconnect wiring; and
selecting a margin for the chip design that satisfies the timing requirement after adjusting the timing path for the first timing effect and the second timing effect, wherein estimating the second timing effect includes applying a correlation to a spatial partitioning of the chip design.

20. A system comprising:
a processor; and
a non-transitory computer-readable memory, the memory storing a computer program executable by the processor to perform the steps of:
receiving, at one or more processors associated with one or more computer systems, a timing requirement for a timing path in a chip design;
estimating a first timing effect on the timing path that accounts for a random variation occurring independent of location within the chip design;
estimating a second timing effect on the timing path that accounts for a systematic variation within the chip design wherein one or more of the first and the second timing effect is a function of interconnect wiring; and
selecting a margin for the chip design that satisfies the timing requirement after adjusting the timing path for the first timing effect and the second timing effect, wherein estimating the second timing effect includes applying a correlation to a spatial partitioning of the chip design.

21. The system of claim 20 wherein the estimating of one or more of the first timing effect and the estimating of the second timing effect includes capacitance variation for the interconnect wiring.

22. The system of claim 21 wherein the estimating of one or more of the first timing effect and the estimating of the second timing effect includes resistance variation for the interconnect wiring.

23. The system of claim 20 wherein the estimating of one or more of the first timing effect and the second timing effect includes crosstalk for the interconnect wiring.

24. The system of claim 20 wherein the spatial partitioning includes a plurality of bins, the correlation correlating a variation of a first of the plurality of bins with a variation of a second of the plurality of bins.

25. The system of claim 24 wherein the correlation is a function of distance between the first and the second of the plurality of bins along a power mesh of the chip design.

26. The system of claim 20 wherein estimating the first timing effect includes applying a formula for one or more cells within the chip design that do not have a statistical library available.

27. The system of claim 20 further comprising the computer program executable by the processor to perform the steps of applying the margin to an on-chip variation analysis of the chip design in order to verify timing, thereby providing a verified chip design.

28. The computer program product of claim 19 wherein the estimating of one or more of the first timing effect and the estimating of the second timing effect includes capacitance variation for the interconnect wiring.

29. The computer program product of claim 28 wherein the estimating of one or more of the first timing effect and the estimating of the second timing effect includes resistance variation for the interconnect wiring.

30. The computer program product of claim 19 wherein the estimating of one or more of the first timing effect and the second timing effect includes crosstalk for the interconnect wiring.

31. The computer program product of claim 19 wherein the spatial partitioning includes a plurality of bins, the correlation correlating a variation of a first of the plurality of bins with a variation of a second of the plurality of bins.

32. The computer program product of claim 31 wherein the correlation is a function of distance between the first and the second of the plurality of bins along a power mesh of the chip design.

33. The computer program product of claim 19 wherein estimating the first timing effect includes applying a formula for one or more cells within the chip design that do not have a statistical library available.

34. The computer program product of claim 19 further comprising computer executable code that, when executing on one or more computing devices, performs the steps of the computer program executable by the one or more computing devices to perform the steps of applying the margin to an on-chip variation analysis of the chip design in order to verify timing, thereby providing a verified chip design.

* * * * *